United States Patent
Sakuta (10) Patent No.: US 8,671,781 B2
(45) Date of Patent: Mar. 18, 2014

(54) METHOD FOR DETECTING A DEVELOPING TORQUE FOR A HYBRID DRIVE

(75) Inventor: Kazumasa Sakuta, Tokioto (JP)

(73) Assignee: Robert Bosch GmbH, Stuttgart (DE)

( * ) Notice: Subject to any disclaimer, the term of this patent is extended or adjusted under 35 U.S.C. 154(b) by 210 days.

(21) Appl. No.: 13/130,667

(22) PCT Filed: Oct. 16, 2009

(86) PCT No.: PCT/EP2009/063589
§ 371 (c)(1),
(2), (4) Date: Sep. 21, 2011

(87) PCT Pub. No.: WO2010/057731
PCT Pub. Date: May 27, 2010

(65) Prior Publication Data
US 2012/0031201 A1   Feb. 9, 2012

(30) Foreign Application Priority Data
Nov. 24, 2008   (DE) .......................... 10 2008 044 016

(51) Int. Cl.
*G01L 3/00* (2006.01)

(52) U.S. Cl.
USPC ......................................... 73/862.08; 73/862

(58) Field of Classification Search
USPC .............................. 73/862.08, 862
See application file for complete search history.

(56) References Cited

U.S. PATENT DOCUMENTS

| | | | |
|---|---|---|---|
| 7,370,715 B2 * | 5/2008 | Colvin et al. ............... | 180/65.28 |
| 7,896,114 B2 | 3/2011 | Colvin et al. | |
| 8,453,817 B2 * | 6/2013 | Schrage ................... | 192/48.611 |
| 8,480,536 B2 * | 7/2013 | Weiss et al. ........................ | 477/5 |
| 2006/0196711 A1 * | 9/2006 | Endo ............................ | 180/65.3 |
| 2007/0272455 A1 * | 11/2007 | Lang et al. ................... | 180/65.2 |
| 2008/0182722 A1 * | 7/2008 | Colvin et al. ................ | 477/180 |
| 2009/0105038 A1 * | 4/2009 | Weiss et al. ........................ | 477/5 |
| 2009/0124453 A1 * | 5/2009 | Seel et al. ......................... | 477/5 |
| 2009/0134820 A1 * | 5/2009 | Sugiyama et al. .............. | 318/66 |
| 2010/0012052 A1 * | 1/2010 | Anz et al. .......................... | 123/2 |
| 2010/0056328 A1 | 3/2010 | Schenk et al. | |
| 2010/0326785 A1 * | 12/2010 | Schrage ..................... | 192/70.12 |
| 2011/0035085 A1 * | 2/2011 | Falkenstein .................... | 701/22 |

(Continued)

FOREIGN PATENT DOCUMENTS

DE     9540921      5/1997
DE   202005019996   3/2006

(Continued)

OTHER PUBLICATIONS

International Search Report, PCT International Patent Application No. PCT/EP2009/063589 dated Mar. 19, 2010.

*Primary Examiner* — Lisa Caputo
*Assistant Examiner* — Jamel Williams
(74) *Attorney, Agent, or Firm* — Kenyon & Kenyon LLP (57) ABSTRACT

A method for detecting a developing torque for a hybrid drive, the hybrid drive having a first drive unit, in particular an electric motor, and a second drive unit, in particular an internal combustion engine, the drive units being coupleable with the aid of a separating clutch, wherein the separating clutch is brought into a predefined engaged position, the torque of the first drive unit is changed, and the developing torque is detected at the predefined engaged position as a function of the change in the torque of the first drive unit.

10 Claims, 5 Drawing Sheets

(56) References Cited

U.S. PATENT DOCUMENTS

| | | | |
|---|---|---|---|
| 2011/0054723 A1* | 3/2011 | Hernier et al. | 701/22 |
| 2011/0124455 A1* | 5/2011 | Borntraeger et al. | 475/5 |
| 2011/0143874 A1* | 6/2011 | Tangl | 475/5 |
| 2011/0180337 A1* | 7/2011 | Khatchikian et al. | 180/65.25 |
| 2011/0186369 A1* | 8/2011 | Richter | 180/65.265 |
| 2011/0202215 A1* | 8/2011 | Falkenstein et al. | 701/22 |
| 2011/0230307 A1* | 9/2011 | Seel | 477/5 |
| 2011/0240384 A1* | 10/2011 | Roske et al. | 180/65.22 |
| 2011/0256978 A1* | 10/2011 | Falkenstein | 477/5 |
| 2011/0288702 A1* | 11/2011 | Falkestein | 701/22 |
| 2011/0301797 A1* | 12/2011 | Steuernagel et al. | 701/22 |
| 2012/0010770 A1* | 1/2012 | Beckett et al. | 701/22 |
| 2012/0116624 A1* | 5/2012 | Reith | 701/22 |
| 2012/0122630 A1* | 5/2012 | Huber et al. | 477/5 |
| 2012/0130579 A1* | 5/2012 | Steuernagel et al. | 701/22 |
| 2012/0303196 A1* | 11/2012 | Kieser et al. | 701/22 |
| 2013/0035201 A1* | 2/2013 | Falkenstein | 477/5 |

FOREIGN PATENT DOCUMENTS

| | | | | |
|---|---|---|---|---|
| DE | 102006048355 | | 4/2008 | |
| DE | 102006048355 A1 * | 4/2008 | | B60K 6/48 |
| DE | 102006048358 | | 4/2008 | |
| WO | WO2005/090109 | | 9/2005 | |

* cited by examiner

METHOD FOR DETECTING A DEVELOPING TORQUE FOR A HYBRID DRIVE

FIELD OF THE INVENTION

The present invention relates to the field of separating clutches in hybrid vehicles.

BACKGROUND INFORMATION

Figure 1:
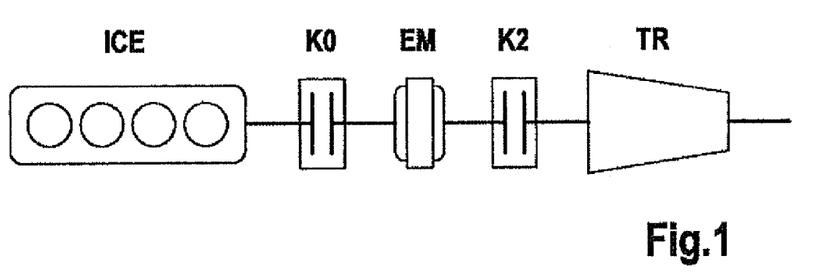
FIG. 1 shows a hybrid drive.

FIG. 1 shows as an example a hybrid drive having an internal combustion engine ICE, a separating clutch K0, an electric motor EM, another separating clutch K2 and a transmission module TR. Separating clutch K0 is provided to separate internal combustion engine ICE from the drive train or to connect it thereto again. Thus, for example, in a purely electric motor drive using electric motor EM as the drive source, separating clutch K0 is disengaged and internal combustion engine ICE is shut down. In a transition from an electric motor drive to a hybrid drive in which both electric motor EM and internal combustion engine ICE are used as drive sources, internal combustion engine ICE may first be driven mechanically by separating clutch K0 to achieve a predefined rotational speed, for example. Separating clutch K0 is operated in a slip state in which it is not completely engaged. At the same time, separating clutch K0 is connected to the drive train on the side of the electric motor. It is therefore of crucial importance for driving comfort in particular to accurately control the slip of separating clutch K0 in hybrid mode. German Patent Application No. DE 105 40 921 A1 describes in this context a system for controlling a servo clutch, in which the clutch control is optimized.

Figure 2:
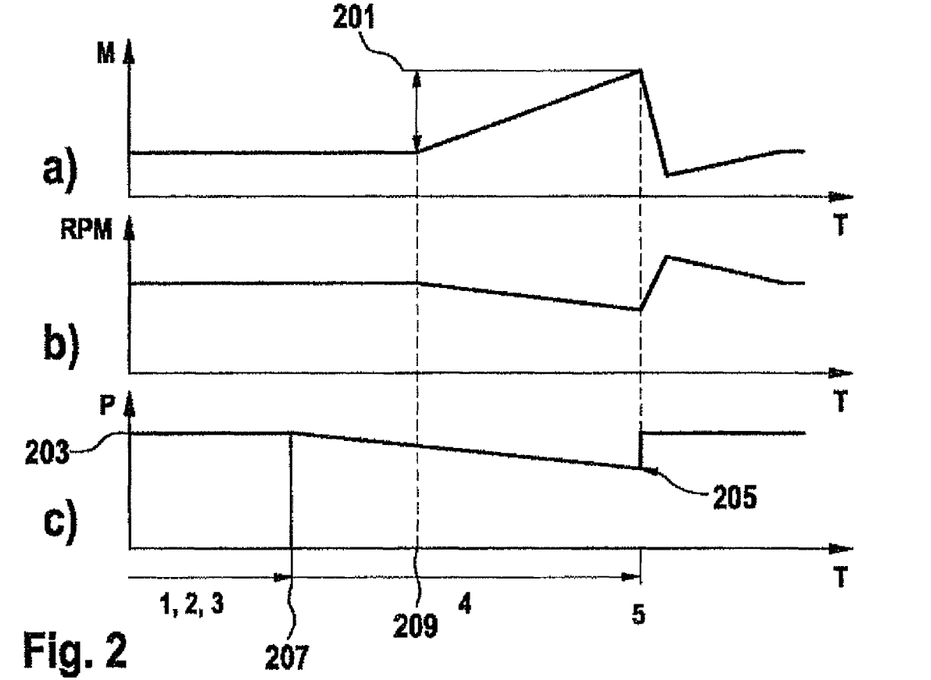
FIG. 2 shows a time diagram of a method for detecting a developing torque.

The developing torque during engagement of separating clutch K0 shown in FIG. 1 may be detected by the method depicted in FIG. 2, for example. FIG. 2A shows a curve of a torque M of an electric motor over time, FIG. 2B shows a curve of a rotational speed of the electric motor over time, and FIG. 2C shows a curve P of the state of separating clutch K0, which may assume any states between a disengaged state and a completely engaged state. Curve P of the state of separating clutch K0 is determined by a curve of the engaged positions of separating clutch K0. Separating clutch K0 is thus in a slip state, for example, when it is only partially engaged and is in a disengaged state when it is completely disengaged.

As shown in FIG. 2A, the torque of the electric motor is increased linearly up to a resulting torque 201 and subsequently reduced again along a ramp. With the increase in torque, the rotational speed of the electric motor illustrated in FIG. 2B drops due to the increase in the clutch transfer torque, but it increases again with a decline in torque. As shown in FIG. 2C, separating clutch K0 is engaged slowly starting from a disengaged state 203 and is therefore in a continuous slip. Separating clutch K0 is engaged until reaching a position 205, in which the resulting developing torque 201 is established.

To detect the developing torque, internal combustion engine ICE is initially shut down and separating clutch K0 is disengaged, the electric motor torque on the main drive axle being kept as constant as possible. The rotational speed of the electric motor is kept constant at 500 rpm, for example, by a speed regulator. At point in time 207, separating clutch K0 is engaged slowly. The speed regulator then attempts to keep the speed of the electric motor constant by generating an additional torque, for example. For detecting the developing torque, at point in time 205 a position of separating clutch K0 is detected at which the electric motor torque has increased by 10 Nm, for example. In this way, the so-called contact point of separating clutch K0, at which the transmitted torque is 0 Nm, may also be detected.

One disadvantage of the method described above is that it may take approximately 3 s to 10 s until the developing torque has been detected during engagement of separating clutch K0. This is due to the fact that the speed of the engaging separating clutch K0 must be lower than the response rate of the speed regulator controlling the electric motor. Consequently, the engaged position of separating clutch K0 at point in time 205 may be detected only as a function of the torque, which has been increased by the speed regulator. In addition, another disadvantage is that separating clutch K0, which is in the slip state for a longer period of time, must withstand higher torques, and it may thus be damaged. For this reason, the learning range to be considered in order to detect the developing torque should have lower torques than these higher torques, so that the torque transmitted via separating clutch K0 is usually less than 10 Nm. It is thus impossible to detect higher rotational speeds and higher torque ranges at 50 Nm, for example, for detecting the developing torque of separating clutch K0. In addition, in the range in which the torque transmitted by separating clutch K0 is low, a higher mechanical tolerance and thus a lower engagement precision of separating clutch K0 are to be expected. For this reason, this method is performed in a mechanically unstable range, so that the developing torque during engagement of separating clutch K0 cannot be detected accurately.

SUMMARY

In accordance with the present invention, the finding that the developing torque in an engaged position of the separating clutch may be detected efficiently if the clutch does not engage slowly but instead is brought in a dedicated manner into a predefined engaged position, in which the separating clutch is in a slip state in particular and is only partially engaged. The developing torque may be, for example, the torque developing on the separating clutch or the developing clutch transfer torque. The developing torque may also include mechanical loss, for example, wear on the clutch disks, a rise in temperature and/or inertia, etc. The developing torque may also be the torque with which the separating clutch loads a drive unit in the predefined engaged position.

As a function of the predefined engaged position, the electric motor torque may be increased by a predefined torque, so that the developing torque may be detected in a targeted and pointed manner. Furthermore, it is possible to disengage the separating clutch again after each time it is engaged during the detection operation, thereby shortening the time during which the separating clutch is in a slip state. In contrast with that, the separating clutch is linearly engaged according to conventional methods for the entire duration of detection, for example, and is thereby exposed to even greater loads.

It is also advantageous that a shorter period of time is needed for the renewed determination of the developing torque. Furthermore, the separating clutch is under lower thermal and mechanical loads, so that clutch wear is reduced on the whole. Furthermore, a determination of the developing torque is also possible at higher torques of the separating clutch, so that a higher detection accuracy is achieved. Furthermore, a characteristic curve may also be recorded at differently high torques, thereby avoiding the disadvantage that calculation of the characteristic curve is possible only on the basis of measurements in the low torque range. According to the present invention, the developing torque may also be detected at comparatively low rotational speeds because in contrast with an internal combustion engine, the electric motor applies a high torque even at lower rotational speeds. Due to the lower mechanical clutch load, lower clutch wear and thus a lower clutch temperature are also to be expected. In addition, the concept according to the present invention is accurate because system influences such as noise, for example, do not enter into the calculation.

The developing torque on the separating clutch is advantageously detected in particular when the internal combustion engine is idle and in particular when the electric motor is rotating constantly at a regulated rotational speed.

For detecting the developing torque in an engaged position of the separating clutch, the latter is preferably brought into a slip state, in which a regulated torque of the electric motor is observed. According to the present invention, a predefined torque, for example, the developing torque on the separating clutch, or the developing clutch transfer torque is selected for the speed regulator on the basis of the expected and developing torque, for example, from a look-up table, and is changed if the prevailing torque on the separating clutch differs from the torque expected on the separating clutch in the respective engaged position.

According to one aspect of the present invention, it relates to a method for detecting a developing torque for or in a hybrid drive, the hybrid drive having a first drive unit, in particular an electric motor, and a second drive unit, in particular an internal combustion engine, the drive units being connectable via a separating clutch. According to this method, the separating clutch is brought into a predefined engaged position, the torque on the first drive unit is changed and the developing torque at a predefined engaged position is detected as a function of the change in the torque of the first drive unit.

According to one specific embodiment, the first drive unit is operated at a predefined rotational speed before the separating clutch is brought into the predefined engaged position at a predefined rotational speed, and the torque of the first drive unit is changed after the separating clutch is brought into the predefined engaged position in such a way that a constant rotational speed of the first drive unit is established. The additional torque to be applied to ensure a constant rotational speed of the first drive unit may therefore be detected in an advantageous manner.

According to one refinement of the present invention, the torque of the first drive unit is increased by a torque predefined as a function of the predefined engaged position in such a way that a constant rotational speed of the first drive unit is again achieved before the change in the torque of the first drive unit. The method step of changing the torque of the first drive unit is therefore advantageously accelerated in such a way that there is again a constant rotational speed of the first drive unit since only a minor remaining torque deviation will have to be regulated out. It is thus advantageously also detected whether the predefined torque must be adapted due to wear on the clutch.

According to one specific embodiment, the value of the predefined torque is increased when, after the separating clutch is brought into the predefined engaged position, the rotational speed of the first drive unit is reduced. The value of the predefined torque is reduced when, after the separating clutch is brought into the predefined engaged position, the rotational speed of the first drive unit is increased. Thus a simple method of detecting the predefined torque is performed in an advantageous manner.

According to one specific embodiment, the developing torque is a developing torque on the separating clutch or a developing clutch transfer torque or a developing torque of the first drive unit or of the second drive unit or a torque with which the first or second unit is loaded by the separating clutch.

According to one specific embodiment the torque of the first drive unit is increased or reduced by a predefined torque. A reduction in the torque of the first drive unit is therefore also counteracted in an advantageous manner.

According to one specific embodiment, the separating clutch is not engaged completely in the predefined engaged position and in particular is operated in a slip state.

According to one aspect, the present invention relates to a method for determining an engaged position of a separating clutch on which a predefined torque develops, the engaged position of the separating clutch being determined as a function of a developing torque, which is detected according to the present invention, for example, a developing torque on the separating clutch or a developing clutch transfer torque. The method according to the present invention for detecting the developing torque is preferably repeated at another engaged position of the separating clutch until the detected developing torque at this engaged position matches the predefined torque on the separating clutch. In particular an engaged position, in which a lower torque develops on the separating clutch, is selected here as the other engaged position, in which the clutch is thus disengaged further if the developing torque is greater than the predefined torque on the separating clutch, and/or an engaged position in which a greater torque develops on the separating clutch, i.e., in which the clutch remains engaged, is selected as the other engaged position when the developing torque is lower than the predefined torque on the separating clutch. The engaged position may also be determined iteratively in this way.

The present invention also relates to a program-technologically equipped device, in particular a control unit, which is designed to execute a computer program for execution of at least one of the methods according to the present invention for detection.

BRIEF DESCRIPTION OF THE DRAWINGS

Additional exemplary embodiments is explained on the basis of the figures.

DETAILED DESCRIPTION OF EXAMPLE EMBODIMENTS

Figure 3:
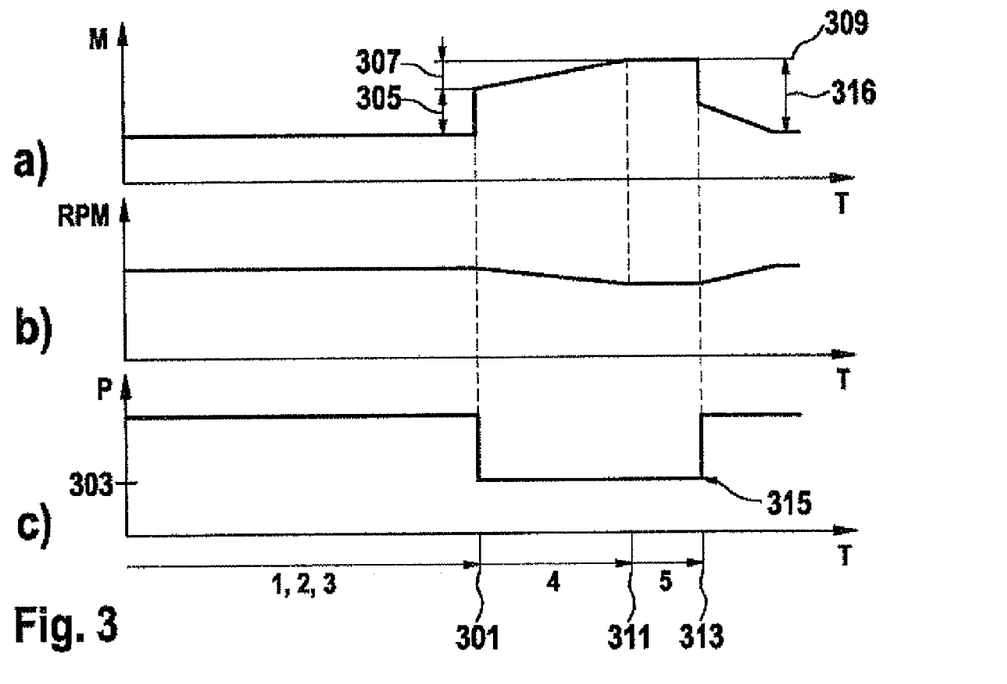
FIG. 3 shows a time diagram of a method for detecting a developing torque.

FIG. 3 shows a time diagram of an example method for detecting a developing torque in an engaged position of a separating clutch K0 illustrated in FIG. 1, for example. FIG. 3a shows a curve of a torque generated by an electric motor as a function of time; FIG. 3b shows a curve of a rotational speed of the electric motor as a function of time, and FIG. 3c shows a curve of a state P of separating clutch K0, which may have a disengaged state, an engaged state and a slip state, as a function of time.

For executing the example method, internal combustion engine ICE is shut off and separating clutch K0 is disengaged. Separating clutch K0 remains disengaged up to a point in time

301, while the electric motor torque is kept constant. The transmission of the hybrid vehicle may be locked in the park position, for example. Furthermore, the rotational speed of the electric motor is kept constant at 500 rpm by a speed regulator, for example. At point in time 301, separating clutch K0 is engaged at least partially and thereby brought into a predefined state 303, for example, brought into a predefined engaged position in which it is in a slip state. The torque of the electric motor is increased by a predefined torque 305, i.e., by a feed forward moment. An electric motor torque is achieved through this feed forward moment, which is assigned to predefined position 303 of separating clutch K0; as shown in FIG. 3b, this electric motor torque may result in a decline in the rotational speed of the electric motor due to the increased clutch transfer torque. To keep the rotational speed constant, a speed regulator regulates the rotational speed of the electric motor at a constant level as a function of a rotational speed difference, which is due to a difference between the expected transfer torque and the prevailing transfer torque of separating clutch K0. For this purpose, another torque 307 is generated, thus yielding a resulting torque 309, which is associated with a constant rotational speed of the electric motor.

On reaching resulting torque 309 at point in time 311, the rotational speed of electric motor EM stabilizes, so that the prevailing state of separating clutch K0, i.e., its final engaged position, and/or the increased electric motor torque may be detected. The developing torque may be detected on this basis.

At point in time 313, separating clutch K0 is disengaged again and its state 315 may be detected. Subsequently, the rotational speed of the electric motor increases and the electric motor torque drops back to the level of the initial torque. Difference 316 between the developing torque and the initial torque yields a learning torque range. To detect the developing torque, in particular to detect a clutch transfer torque, the example method may be executed in different engaged positions. A characteristic curve of the developing torque may thus be detected at multiple engaged positions of the separating clutch.

For the case when the speed regulator of electric motor EM is unable to compensate for a rapid change in torque, then, as described above, the speed regulator may generate a torque by increasing the electric motor torque by the predefined torque, which may also be referred to as a so-called feed forward moment. For the case when the developing torque is equal to the present clutch transfer torque, the speed regulator therefore need no longer perform any regulation.

Proportional-integral feedback elements (PI) may be used to regulate the rotational speed of electric motor EM, but their response rate is too slow to compensate for a change in rotational speed by a movement of separating clutch K0. Therefore, exclusively proportional P elements are used to control the rotational speed of the electric motor.

Figure 4:
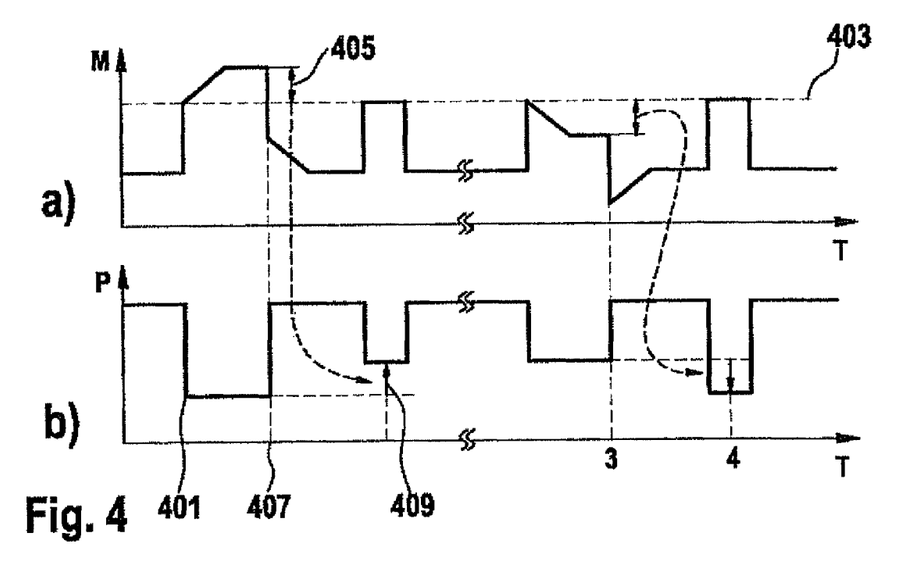
FIG. 4 shows a time diagram of a method for detecting a developing torque.

To detect a state of separating clutch K0, for example, its engaged position, in which a certain torque develops, the example method may be executed as depicted in FIG. 4. In FIG. 4a, a torque of the electric motor is shown as a function of time T, and in FIG. 4b a position P of separating clutch K0, which is determined by its state or by the arrangement of the clutch disks, is shown as a function of time T. Beginning with a predefined rotational speed and a disengaged separating clutch K0, the latter is engaged at least partially at point in time 401 and thereby brought into a slip state. The torque of electric motor EM is preferably increased at the same time, so a developing torque, which may be higher than an expected torque 403, for example, and differs from expected torque 403 by a differential torque 405, for example, may be detected. After a predefined time interval has elapsed, the clutch is disengaged again at point in time 407, whereby the electric motor torque drops. Subsequently, separating clutch K0 is engaged again and thereby brought into another slip state, in which the torque transferred by separating clutch K0 is lower by differential torque 405 than the torque transferred at point in time 401. The engaged position of the separating clutch differs then by differential amount 409. At the same time, the torque of the electric motor preferably also increases at the same time, and reaches expected torque 403, for example.

The sequence steps described above may be repeated until a predefined slip state or a predefined engaged position of separating clutch K0 has been established, in which the resulting electric motor torque corresponds to expected torque 403. Thus, the position of separating clutch K0 is adjusted in the direction of disengaged separating clutch K0 as a function of a torque deviation, if the detected torque is greater than expected torque 403. If the detected torque is lower than expected torque 403, then the position of separating clutch K0 is adjusted in the direction of its engaged state as a function of the torque deviation.

Figure 5:
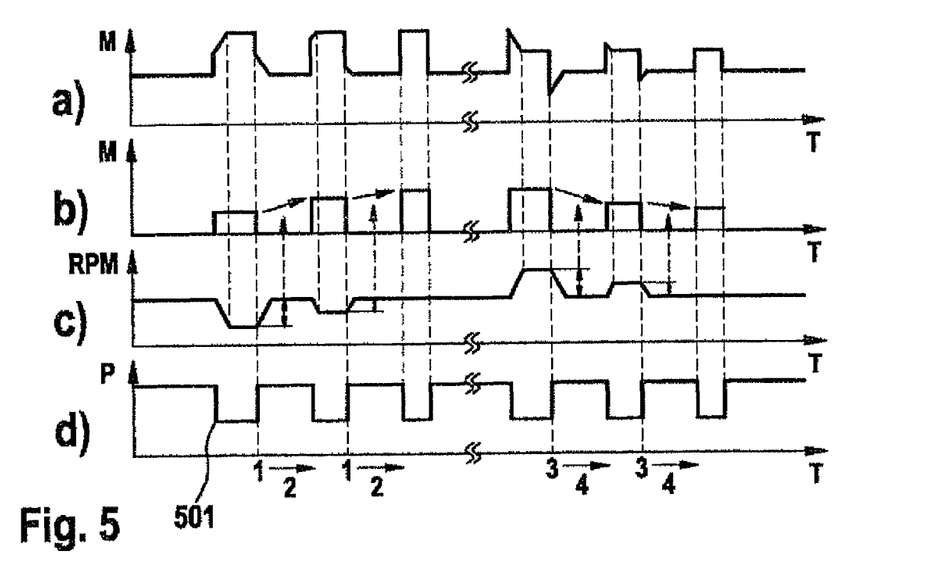
FIG. 5 shows a time diagram of a method for detecting a developing torque.

For the case when the expected clutch transfer torque is greater or less than the prevailing clutch transfer torque, the speed regulator is not normally capable of keeping the rotational speed of the electric motor EM constant because the movement of separating clutch K0 is faster than the response time of the speed regulator. In this case, the expected torque and thus the predefined torque by which the torque is to be increased or reduced when there is a predefined slip state of separating clutch K0 may be adjusted as depicted in FIG. 5. FIG. 5a shows a curve of the torque of the electric motor as a function of time; FIG. 5b shows a curve of the predefined torque as a function of time; FIG. 5c shows a curve of the torque of the electric motor as a function of time, and FIG. 5d shows a state, i.e., an engaged position, of separating clutch K0.

Starting from a predefined electric motor torque, a disengaged clutch state and a predefined rotational speed of electric motor EM, separating clutch K0 is at least partially engaged at point in time 501 and thereby brought into a slip state. As shown in FIG. 5c, the rotational speed of the electric motor then drops by a rotational speed difference represented by the arrow in FIG. 5c. To prevent this drop, according to FIG. 5b, at a point in time before point in time 501, a predefined torque shown in FIG. 5b by which the torque of the electric motor is increased is selected. The speed regulator attempts to adjust the rotational speed. Subsequently, separating clutch K0 is disengaged again and the torque of electric motor EM is reduced by the predefined torque. As shown in FIG. 5c, the rotational speed of electric motor EM thereby increases. Subsequently, separating clutch K0 is engaged again in a second phase, but shortly before that another predefined torque, which is higher than the predefined torque used previously, for example, is selected to increase the torque of the electric motor. As shown in FIG. 5c, the rotational speed of the electric motor thereby also drops, but the decline is less than that in the preceding cycle. In a subsequent cycle, separating clutch K0 is disengaged again and again brought into the predefined slip state, i.e., to a predefined engaged position, in which a predefined torque which is even greater, for example, is selected to increase the torque of the electric motor. This example method is repeated in additional phases 3 and 4 until a predefined torque results, which may be allocated to the predefined slip state depicted in FIG. 5d, which is always the same. The fast forward moment is thus increased as a function of a rotational speed deviation if the rotational speed of electric motor EM is lower. For the case when the rotational speed of electric motor EM increases, the additional fast forward moment may be reduced as a function of the rotational speed deviation. These example method steps may be repeated until a stable state having a constant rotational speed of the electric motor has developed.

What is claimed is:

1. A method for detecting a developing torque for a hybrid drive, the hybrid drive having a first drive unit and a second drive unit, the first drive unit being an electric motor and the second drive unit being an internal combustion engine, the first drive unit and the second drive unit being coupleable with the aid of a separating clutch, the method comprising:
   without putting the separating clutch into a linearly varying engagement, bringing the separating clutch into a predefined engaged position corresponding to a constant slip state;
   changing a torque of the first drive unit; and
   detecting a developing torque at the predefined engaged position as a function of the change in the torque of the first drive unit.

2. The method as recited in claim 1, further comprising:
   operating the first drive unit at a predefined rotational speed before bringing the separating clutch into the predefined engaged position;
   wherein the torque of the first drive unit is changed after the separating clutch is brought into the predefined engaged position, in such a way that a constant rotational speed of the first drive unit develops.

3. The method as recited in claim 2, further comprising:
   increasing the torque of the first drive unit by a predefined torque as a function of the predefined engaged position.

4. The method as recited in claim 3, wherein a value of the predefined torque is increased when, after the separating clutch is brought into the predefined engaged position, the rotational speed of the first drive unit is reduced, and a value of the predefined torque is reduced when, after the separating clutch is brought into the predefined engaged position, the rotational speed of the first drive unit increases.

5. The method as recited in claim 1, wherein the developing torque is one of a developing torque on the separating clutch, a clutch transfer torque or developing torque of the first drive unit, or a clutch transfer torque or developing torque of the second drive unit.

6. The method as recited in claim 1, wherein the torque of the first drive unit is increased or decreased by a predefined torque.

7. The method as recited in claim 1, wherein the separating clutch is not engaged completely in the predefined engaged position, and is operated in a slip state.

8. A method for determining an engaged position of a separating clutch in a hybrid drive, the hybrid drive having a first drive unit and a second drive unit and being coupleable with the aid of a separating clutch, the method including developing a predefined torque on the separating clutch, and determining the engaged position of the separating clutch as a function of a detected developing torque, the developing torque being detected by performing the steps of, without putting the separating clutch into a linearly varying engagement, bringing the separating clutch into a predefined engaged position corresponding to a constant slip state, changing the torque of the first drive unit, and detecting the developing torque as a function of the change in the torque of the first drive unit, the steps being repeated at another engaged position of the separating clutch until the detected developing torque at this engaged position matches the predefined torque on the separating clutch.

9. The method as recited in claim 8, wherein at least one of:
i) an engaged position in which a lower torque develops on the separating clutch is selected as the other engaged position when the developing torque is greater than the predefined torque on the separating clutch, and ii) an engaged position in which a greater torque develops on the separating clutch is selected as the other engaged position when the developing torque is lower than the predefined torque on the separating clutch.

10. A control unit adapted to perform a method for detecting a developing torque for a hybrid drive, the hybrid drive having a first drive unit and a second drive unit, the first drive unit and the second drive unit being coupleable with the aid of a separating clutch, the method comprising:
   without putting the separating clutch into a linearly varying engagement, bringing the separating clutch into a predefined engaged position corresponding to a constant slip state;
   changing a torque of the first drive unit; and
   detecting a developing torque at the predefined engaged position as a function of the change in the torque of the first drive unit.

* * * * *

UNITED STATES PATENT AND TRADEMARK OFFICE
CERTIFICATE OF CORRECTION

PATENT NO. : 8,671,781 B2  Page 1 of 1
APPLICATION NO. : 13/130667
DATED : March 18, 2014
INVENTOR(S) : Kazumasa Sakuta It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 330 days.

Signed and Sealed this
Twenty-ninth Day of September, 2015

Michelle K. Lee
*Director of the United States Patent and Trademark Office*